US005665204A

United States Patent [19]

Rodriguez et al.

[11] Patent Number: 5,665,204
[45] Date of Patent: Sep. 9, 1997

[54] METHOD FOR DE-INKING PRINTED WASTE PAPER BY THE WASHING PROCESS USING AN ALKOXYLATED NONIONIC SURFACTANT

[75] Inventors: Jose M. Rodriguez; Gail M. Howell, both of Fort Mill; Anthony B. Cook, Simpsonville, all of S.C.

[73] Assignee: Geo Specialty Chemicals, Inc., Cleveland, Ohio

[21] Appl. No.: 504,302

[22] Filed: Jul. 20, 1995

[51] Int. Cl.$^6$ ............................................. D21C 5/02
[52] U.S. Cl. ............................................ 162/5; 162/4
[58] Field of Search ...................... 162/5, 199, DIG. 4, 162/4; 252/60, 61; 510/174, 424

[56] References Cited

U.S. PATENT DOCUMENTS

| | | | |
|---|---|---|---|
| 3,354,028 | 11/1967 | Illingworth et al. | |
| 4,518,459 | 5/1985 | Freis et al. | 162/5 |
| 5,102,500 | 4/1992 | Darlington | 162/5 |
| 5,302,242 | 4/1994 | Richmann et al. | 162/5 |
| 5,304,316 | 4/1994 | Urusshibata et al. | 252/60 |
| 5,417,808 | 5/1995 | Okamoto et al. | 162/5 |
| 5,460,695 | 10/1995 | Kato | 162/5 |

OTHER PUBLICATIONS

Escher Wyss News 1971, "Repulping of Printed Waste Paper by Floation of Printing Ink (Deinking)" by W. Matzke.

*Primary Examiner*—Donald E. Czaja
*Assistant Examiner*—Jose A. Fortuna
*Attorney, Agent, or Firm*—Thompson Hine & Flory LLP

[57] ABSTRACT

A process for deinking a printed wastepaper pulp slurry comprising:

(a) adding to a printed wastepaper pulp slurry a deinking composition consisting essentially of a nonionic ethoxylated and propoxylated surfactant of the formula (I):

$$R-O-(OCH_2CH_2)_n-(OCH_2CHCH_3)_m-(OCH_2CH_2)_q-O-X(I)$$

wherein n is a number from about 1 to about 50, m is a number from about 1 to about 50, q is a number from about 1 to about 50, and R and X are H or an alkyl, alkenyl, or aryl group containing from about 3 to about 35 carbon atoms;

(b) washing the slurry in order to obtain a deinked paper pulp suspension and an ink suspension; and (c) separating the deinked paper pulp suspension from the ink suspension.

10 Claims, 2 Drawing Sheets

METHOD FOR DE-INKING PRINTED WASTE PAPER BY THE WASHING PROCESS USING AN ALKOXYLATED NONIONIC SURFACTANT

FIELD OF THE INVENTION

The present invention relates to a process for de-inking printed waste paper by the washing process. The de-inking of printed waste paper is intended to remove printing ink from paper and to recover a paper pulp that may be used to prepare printing paper for newspapers, magazines, books, etc. The printing paper consists essentially of cellulose fibers and fillers, while the printing ink consists of pigments held together by suitable vehicles.

BACKGROUND OF THE INVENTION

One of the best known de-inking processes is the so-called washing process. In this process, the printed waste paper is slurried in water and the resulting suspension is successively washed. During pulping of the printed waste paper in water, the printed waste paper is crushed and fiberized in an alkaline medium, with the aid of heat, mechanical stirring, and with suitable de-inking compositions which remove the ink more or less thoroughly from the paper fibers.

The washing process involves a series of concentrating or thickening and dilution steps of the aqueous slurry obtained from the waste paper pulping and is designed to result in the formation of two aqueous suspensions; a more dilute water suspension containing the greatest possible quantity of the ink, and a more concentrated water suspension containing paper fibers that are as free as possible from the ink. This latter suspension is used in the manufacture of new paper. It may be said that dilution washing is the mechanical process of rinsing dispersed ink particles from pulp.

In practice, in the known washing processes, the more dilute water suspension containing the greatest possible quantity of the ink contains a considerable amount of paper fibers and fillers. Thus, the more dilute suspension must be suitably treated before being partially recycled or discharged as an effluent. In general, such treatment is accomplished by adding flocculants consisting of polyelectrolytes to the suspension which is then subjected to flotation in an acid or neutral medium in order to remove ink particles therefrom. See U.S. Pat. No. 3,354,028 to Illingworth. Proceeding in this manner, however, the fibers and mineral fillers are floated together with the ink, thereby causing an important part of the fibers and the mineral fillers to be lost, which otherwise would be useful for the preparation of new paper.

Thus, in summary, it may be said that with the de-inking compositions of the prior art and with the known de-inking washing processes the loss in recovered paper is in general relatively high. See Escher Wyss News, Vol. 44, 1971(1), pages 70 to 79.

Still another drawback of the known washing processes is that the floated mass, since it contains a considerable amount of fibers, has a considerable volume and, as such, is difficult to be disposed of.

Thus, the primary object of this invention is to provide an improved washing de-inking process that will enable one, with a limited consumption of reactants and with limited masses of processing water, to recover pulp having a high degree of brightness in a high yield.

SUMMARY OF THE INVENTION

Other than in the operating examples, or where otherwise indicated, all numbers expressing quantities of ingredients or reaction conditions used herein are to be understood as modified in all instances by the term "about".

In accordance with this invention, a new washing de-inking process has now been found which will enable one to readily achieve the objects indicated above. This new process involves the use of a deinking composition which consists essentially of a nonionic ethoxylated and propoxylated surfactant corresponding to formula I:

$$R-O-(OCH_2CH_2)_n-(OCH_2CHCH_3)_m-(OCH_2CH_2)_q-O-X(I)$$

wherein n is a number from 1 to about 50, m is a number from 1 to about 50, q is a number from 1 to about 50, and R and X are H or an alkyl, alkenyl, or aryl group containing from about 3 to about 35 carbon atoms, and combinations thereof.

The nonionic ethoxylated and propoxylated surfactant of the de-inking composition of this invention is present in an amount of from about 0.1 to about 10% by weight, based on the weight of the paper.

PREFERRED EMBODIMENT OF THE INVENTION

Figure 1:
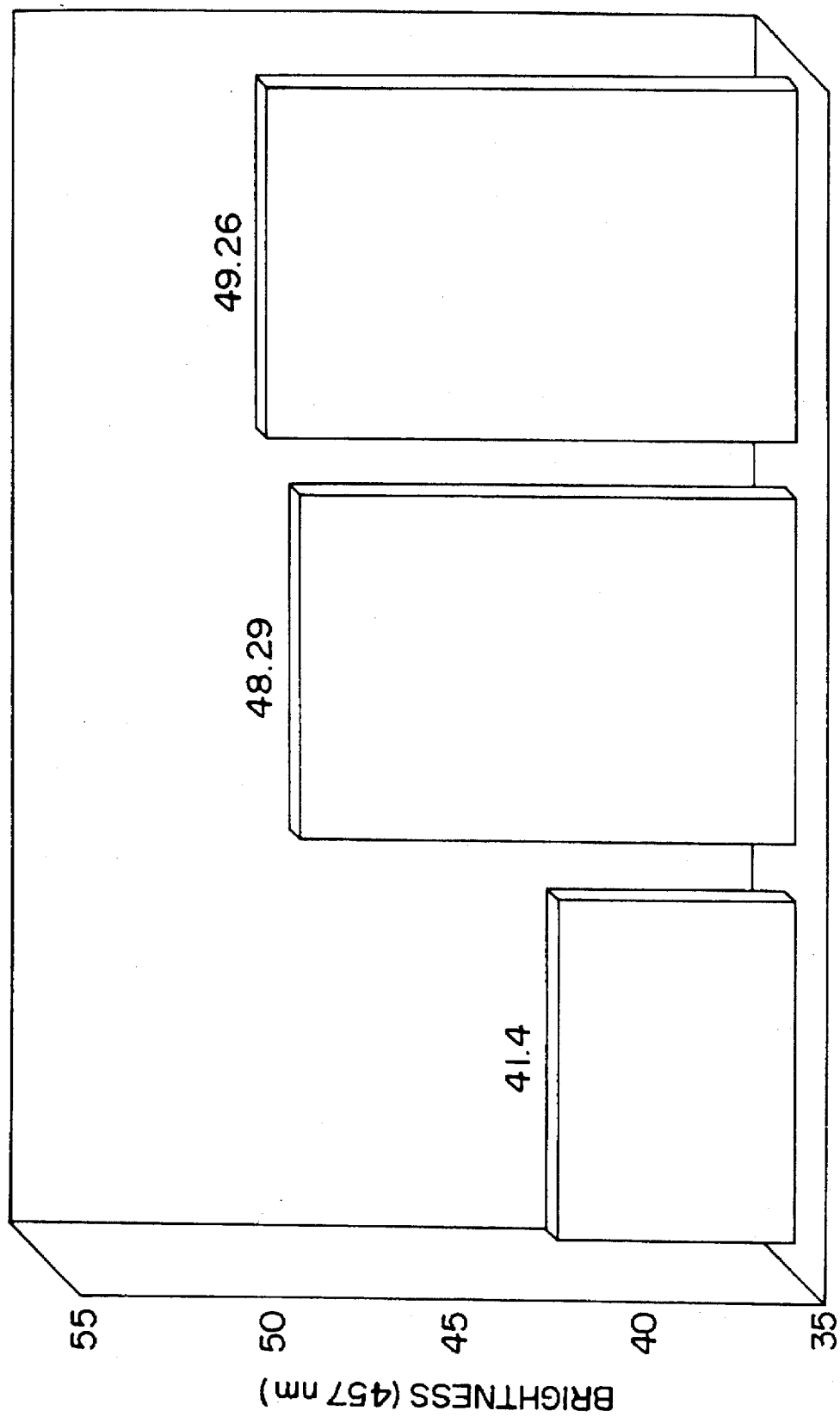
FIG. 1 is a bar graph illustrating a comparison of the degree of pulp brightness obtained using applicant's nonionic surfactant in the washing process versus a conventional deinking composition.

In a preferred embodiment, the nonionic surfactant corresponding to formula I has from 1 to 50, and preferably from 5 to 15 ethylene oxide units, followed by 1 to 50 and preferably 5 to 20 propylene oxide units and is capped with 1 to 50 and preferably 5 to 20 units of ethylene oxide.

The washing process for de-inking printed waste paper using the nonionic surfactant of formula I involves the following steps:

(a) a pulping step wherein the printed waste paper is treated with water containing the nonionic surfactant of formula I in a reactor fitted with a stirring system; and (b) one or more washing steps are then performed from which there are obtained two separate suspensions, one containing de-inked paper; the other containing ink, fillers, and paper fibers.

According to the invention, the above-mentioned process is characterized in that from about 0.1 to about 10%, and preferably from about 0.2 to 2% by weight, based on the dry weight of the paper being treated, of the deinking composition of the present invention is added to an aqueous suspension containing printed waste paper with agitation, thus causing the ink particles to separate from the paper. The aqueous suspension of paper pulp and separated ink particles is then washed in at least one, but preferably multiple washing steps using water as the washing medium in a manner commonly known in the art. The ink particles are thereby washed from the de-inked pulp which may then be used for other purposes.

The process may be carried out either in a continuous way or batchwise, providing excellent results with any type of printed waste paper (even paper containing many fillers), and with any type of print: daily newspapers (letter-press or offset), illustrated magazines (coated or uncoated), electronic computer tabulations, paper of archives with or without mechanical pulp, trimmings from typographical or from paper-working industries, and printed polyethylenized cardboards, etc.

In the practical realization of the washing process using the nonionic surfactant of formula I, the pulping is carried out in a conventional pulping apparatus into which water, printed paper, and chemical additives are fed.

The washing process involves rinsing of undesirable particulates such as ink particles from the pulp slurry. Thus, washing is the mechanical process of rinsing dispersed particles, such as ink, from pulp. Effective washing depends on rendering ink particles hydrophilic, i.e., attracted to water, so that they are removed with washing effluent. That is, the fine ink particles must pass through the fiber network and screen of a washing device. The pulp slurry should be well screened with small holes, or holes and slots in combination to remove any large particles of debris that could potentially cause operational problems. Types of washing units include gravity deckers, sidehill screens, dewatering screws, and twin-wire machines. By this process there is obtained pulp fibers from which contaminants including ink particles are removed, and a water phase containing the contaminants.

The water phase, i.e., the ink-laden washing effluent may then be clarified to concentrate the ink for economical treatment and disposal, and recycling of such washer effluent is a way of minimizing water consumption. Thus, the ink-laden washing effluent is passed into a clarifier to take as much of the ink, dirt, filler, fines, fibers, etc. that have been sent to the water loop out of the system such that clean water can be sent back to wherever water is required, for example, the pulper, shower bars and dilution points. Most de-inking mills have one or two stages of clarification, and usually employ a dissolved air flotation process.

The nonionic surfactant of formula I is added to the pulper in quantities of 0.1 to 10% by weight, preferably 0.2 to 2% by weight, based upon the dry weight of the paper being treated. The amount of nonionic surfactant to be used depends on the type of paper and on the type of print or ink present. In general, in the pulping step it is preferable to feed initially a part of the water and then, in the following order: nonionic surfactant of formula I, paper, and the remaining water.

When operating batchwise, the pulping is preferably carried out for a period of time between 8 and 35 minutes (usually 10 to 30 minutes), and at a temperature of 30° to 80° C. This temperature may be obtained by the direct heating of the pulping apparatus or by preheating the water. After pulping, the cycle goes on without further heating.

When operating in a batchwise mode, it is convenient to have the pulping apparatus followed by one or more storage vats which serve to feed successive apparatus. The dwell time in the storage vats is not critical.

The suspension obtained by the pulping is then conveyed to the successive washing operations that are carried out according to known techniques. Usually, the washing process comprises the so-called screening step and a washing step proper. The screening step is intended to eliminate the heavier and rougher particles (for instance metal staples) as well as the lighter ones (e.g. plastic materials), while the washing step is intended to secure the removal of the ink with the waters and to separate a de-inked paper.

The washing step proper consists generally of dilutions of the pulp slurry followed by countercurrent filterings with water, and is preferably conducted in at least three steps. The de-inked paper obtained from the washing may be subjected to either an oxidizing or a reducing/bleaching step according to known techniques.

In the process using the nonionic surfactant of this invention, an oxidizing or bleaching step with, for example, hydrogen peroxide may be conveniently coupled to the pulping step. In this case, the pulping step is preferably carried out at 50° to 80° C., adding, besides the already-indicated additives, a quantity of hydrogen peroxide equal to 0.5 to 3% by weight, with respect to the weight of the paper, and by maintaining the suspension thus obtained in one or more storage vats for at least 40 minutes. Usually it is advisable to have a dwell time of 40 to 120 minutes, although longer times are equally applicable.

The suspension obtained from the washing step contains ink, small-sized cellulose fibers, and fillers. The total quantity of recycled and clarified water and its distribution between the pulping and the washing steps depend on the dilutions that one wishes to obtain respectively in those steps.

Summing up, the advantages of the washing process using the nonionic surfactant of formula I, with respect to the prior art de-inking processes, are the following:

(1) less foam is formed during the deinking process, thus providing a more efficient separation of ink, etc. from paper pulp; and (2) the deinked paper pulp produced has an increased degree of brightness.

Other advantages and characteristics of the process of this invention will be still more readily understood from the following examples, which are not to be taken, however, as limiting the inventive idea and scope of the invention.

Synthesis of POE(8)POP(12)POE(6)Nonyl Phenol

15–25 inches of vacuum was pulled from a sealed reactor. The reactor was then charged with 14.31 grams of nonyl phenol. $N_2$ was then introduced into the reactor with agitation. 0.2 grams of potassium hydroxide was then added and the reactor was heated to 40°–50° C. and the $N_2$ was turned off. The vacuum was then turned on to pull 25–38 inches and the temperature was raised to 70°–90° C. The reactor was then purged with nitrogen bringing the pressure within the reactor to 15 psi. Vacuum was then pulled again to 25–58 inches. The reactor was again purged with nitrogen to 8–10 psi, followed by another vacuum pull to 25–58 inches. The nitrogen was then turned off and the first charge of ethylene oxide was conducted with the temperature increasing to 145°–155° C. As this temperature was maintained, a total of 17.17 grams of ethylene oxide was added to the reaction mixture. After the reaction was completed the vacuum was once again pulled followed by a nitrogen purge. The nitrogen was then again turned off and 25–58 inches of vacuum pulled. A total amount of 45.26 grams of propylene oxide was then added to the reaction mixture. After completion of this reaction, successive vacuum pulls, followed by nitrogen purges was performed. 22.87 grams of ethylene oxide were then added to the reaction mixture. After this reaction, another vacuum pull was then conducted to drive off any unreacted ethylene oxide. Nitrogen was then introduced in order to sparge the reactor and increase the pressure therein. 0.19 grams of sulfuric acid was then added to the reaction mixture in order to neutralize the mixture.

Brightness Test

EXAMPLE 1

To 100 grams of shredded newspaper were added 666 ml of water at 45° C. and 0.5 grams of the above-synthesized nonionic surfactant in order to produce a pulp slurry having a pH of about 8.5. The pulp slurry was then diluted to 5% consistency and placed in a disintegrator for approximately 5 minutes. 5 grams of the pulp slurry was then placed in an Ernst Haage sheet forming apparatus and washed with approximately 2 liters of water. A paper sheet was then formed under vacuum and dried. The brightness of the paper was then measured to be 457 nm using a Technidyne Brightemeter.

COMPARISON EXAMPLE I

A comparison example was then prepared in accordance with the procedure of Example 1 above, except using NEODOL® 45-13 as the deinking agent. NEODOL® 45-13 is an ethylene oxide aduct containing 13 moles ethylene oxide per mole of oxo alcohol manufactured by Shell Co. It is currently the standard deinking agent used in the industry. It is the second generation of surfactants used in the deinking process. The first generation of surfactants used for deinking were ethoxylated nonyl phenols. They were at that time considered high foamers and, as a result, were deemed problematic in the washing deinking process. The currently used ethoxylated oxo alcohols are similarly considered too foamy. Thus, a low-foaming washing deinking process which provides equal or improved paper yield and brightness has been sought by the paper deinking industry.

The Comparison Example was then also measured for brightness using the technique of Example 1. The results of the brightness tests are shown in FIG. 1, along with that of a blank. There it can be seen that paper sheets formed from pulp generated by the present process has an increased degree of brightness, as compared to paper formed from washing processes using ethoxylated oxo alcohols as the deinking agent or no deinking agent at all.

Foam Test

EXAMPLE II

To 300 ml of deionized water, there was added 1.5 grams of the above-synthesized surfactant used in the present invention. This mixture was then mixed well and poured into a 1000 ml graduated cylinder adapted with blender blades. The graduated cylinder was then inserted into a Waring blender and mixed at high speed for about 1 minute. Five minutes after the blender was shut-off the foam in the cylinder was measured using the scale thereon.

Figure 2:
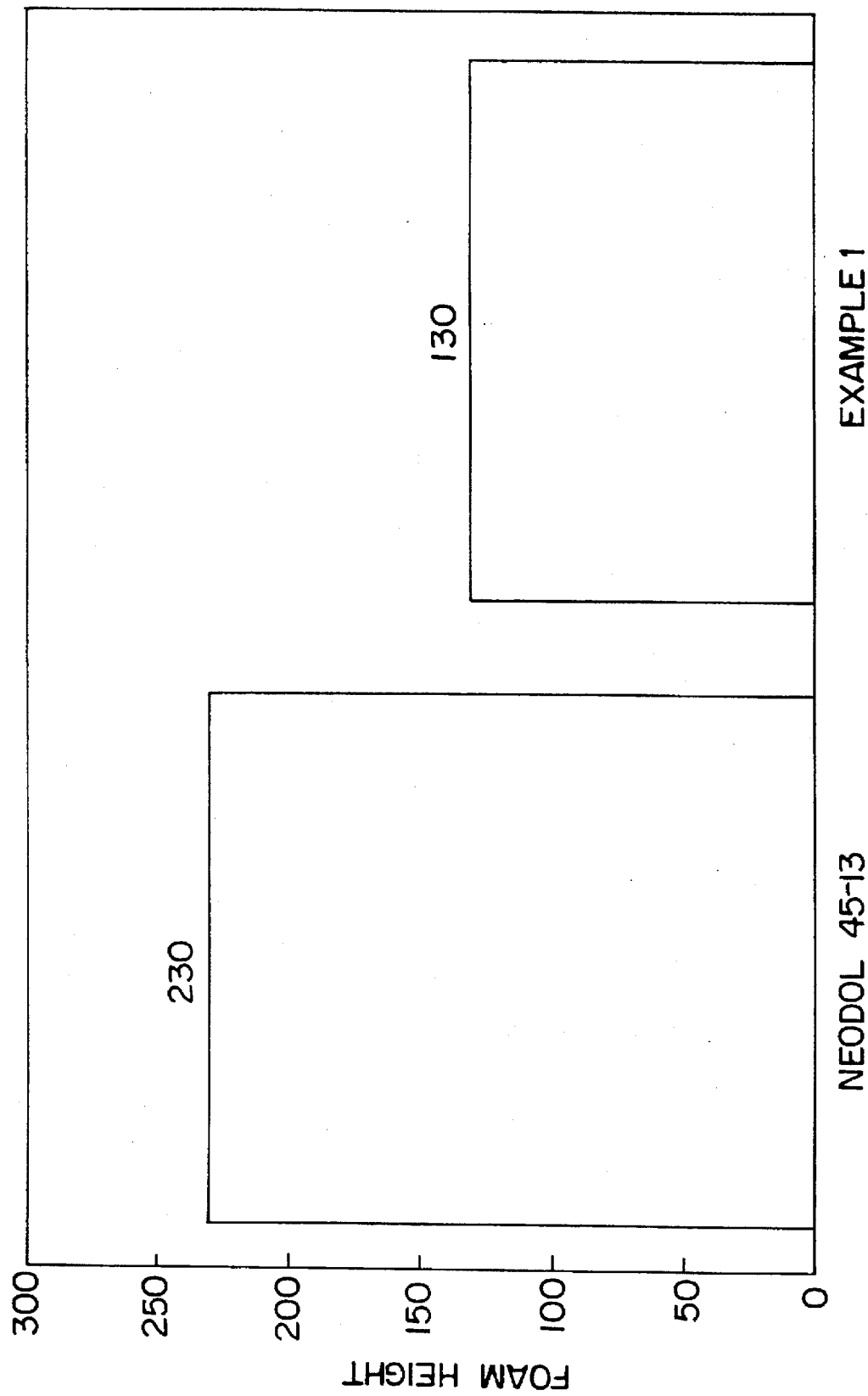
FIG. 2 is a bar graph illustrating a comparison of the amount of foam formed using applicant's nonionic surfactant in the washing process versus a conventional deinking composition.

COMPARISON EXAMPLE II 1.5 grams of NEODOL® 45-13 was added to 300 ml of deionized water and measured for foam formation in accordance with the test procedure of Example II. The results of the foam test comparing the amount of foam generated using the process of the present invention versus that of the industry standard and a blank are shown in FIG. 2.

As can be clearly seen from the results, by employing the washing deinking process of the present invention, a product having an increased degree of brightness can be formed, while the generation of unwanted foam incident to the washing process is significantly reduced.

What is claimed is:

1. A process for deinking a printed wastepaper pulp slurry comprising:

(a) adding to said pulp slurry a deinking composition consisting essentially of a nonionic ethoxylated and propoxylated surfactant of the formula (I):

wherein n is a number from about 1 to about 50, m is a number from about 1 to about 50, q is a number from about 1 to about 50, and R and X are H or an alkyl, alkenyl, or aryl group containing from about 3 to about 35 carbon atoms;

(b) washing said slurry in order to obtain a deinked paper pulp suspension and an ink suspension; and (c) separating said deinked paper pulp suspension from said ink suspension.

2. The process of claim 1 wherein from about 0.1 to about 10% by weight, based on the dry weight of printed wastepaper to be deinked, of said nonionic surfactant is added to said pulp slurry.

3. The process of claim 2 wherein from about 0.2 to about 2% by weight, based on the dry weight of printed wastepaper to be deinked, of said nonionic surfactant is added to said pulp slurry.

4. The process of claim 1 wherein said pulp slurry has a pH of about 8.5.

5. The process of claim 1 further comprising agitating said pulp slurry in order to promote more efficient separation of said deinked paper pulp suspension from said ink suspension.

6. The process of claim 1 wherein n of formula I is an integer from 5 to 15.

7. The process of claim 1 wherein m of formula I is an integer from 5 to 20.

8. The process of claim 1 wherein q of formula I is an integer from 5 to 20.

9. The process of claim 1 further comprising a screening step for the removal of large undesirable particles.

10. The process of claim 1 further comprising a bleaching step.

* * * * *